United States Patent

Nitschke et al.

[11] Patent Number: 5,942,099
[45] Date of Patent: Aug. 24, 1999

[54] METHOD AND DEVICE FOR REMOVAL OF $NO_x$ FROM ENGINE EXHAUST

[75] Inventors: Felix Nitschke, Müchen; Jörg Wind, Karlsfeld, both of Germany

[73] Assignee: Daimler-Benz AG, Ottobrunn, Germany

[21] Appl. No.: 08/989,023

[22] Filed: Dec. 11, 1997

[30] Foreign Application Priority Data

Dec. 11, 1996 [DE] Germany .............................. 196 51492

[51] Int. Cl.$^6$ .................................................. C25C 1/00
[52] U.S. Cl. ...................... 205/617; 205/763; 204/243.1; 204/270
[58] Field of Search ................................ 204/243.1, 267, 204/270, 277, 278, 246, 247; 205/617, 763, 764

[56] References Cited

U.S. PATENT DOCUMENTS

| | | |
|---|---|---|
| 3,847,672 | 11/1974 | Trocciola et al. ..................... 136/86 C |
| 4,617,029 | 10/1986 | Pez et al. ..................................... 55/16 |
| 4,738,760 | 4/1988 | Marianowski et al. .................. 204/130 |
| 4,908,113 | 3/1990 | Marianowski et al. ............. 204/243 R |

*Primary Examiner*—Kathryn Gorgos
*Assistant Examiner*—Thomas H. Parsons
*Attorney, Agent, or Firm*—Evenson, McKeown Edwards & Lenahan P.L.L.C.

[57] ABSTRACT

An apparatus and method for removing $NO_x$ from the exhaust of internal combustion engines. The apparatus has a porous absorbent body saturated with a liquid alkaline electrolyte for absorption of $NO_x$ as nitrate and nitrite, in which body electrodes are distributed pairwise for electrochemical decomposition of the nitrate and nitrite to form nitrogen. The method uses the apparatus of the invention to decompose nitrates and nitrites into diatomic nitrogen.

24 Claims, 1 Drawing Sheet

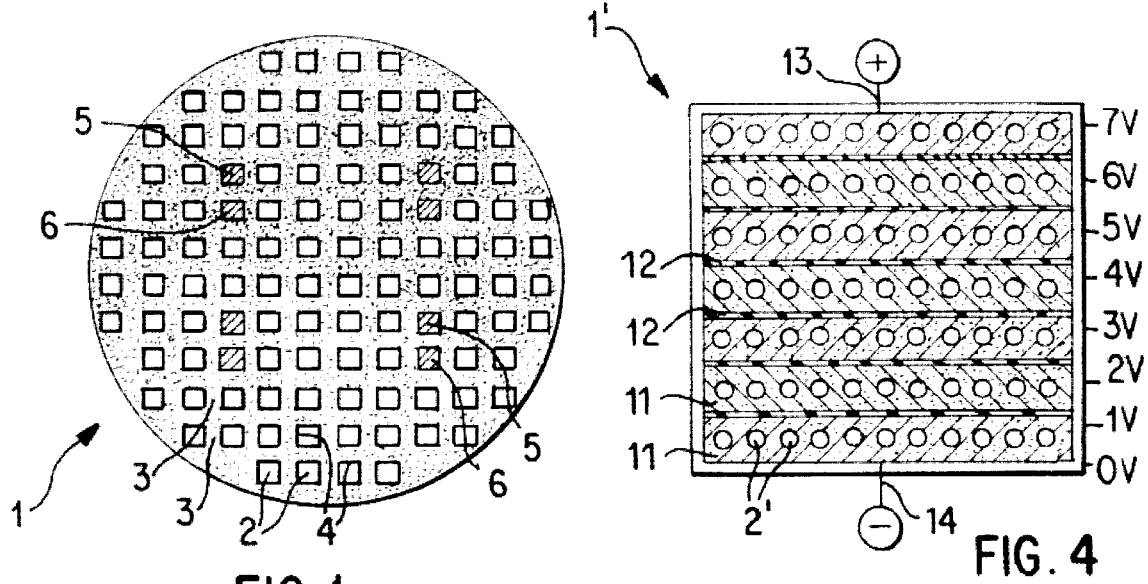
FIG. 1
FIG. 4
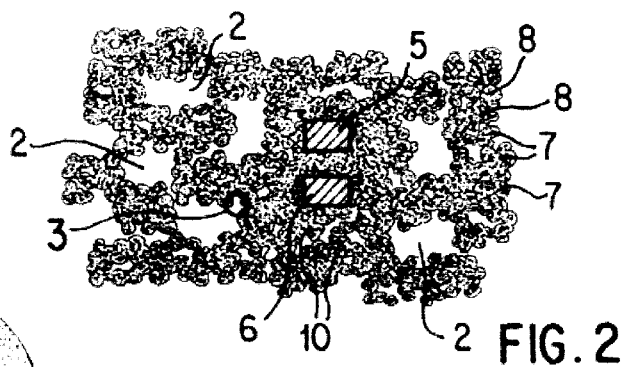
FIG. 2
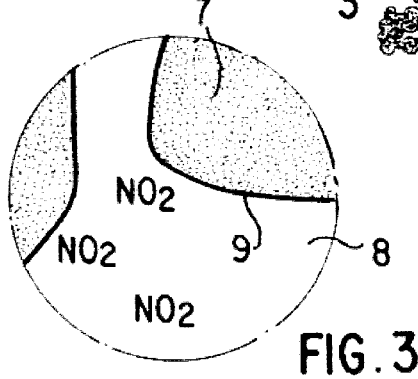
FIG. 3
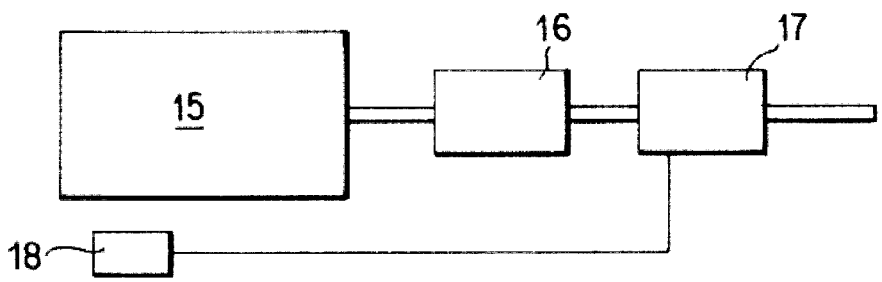
FIG. 5

METHOD AND DEVICE FOR REMOVAL OF $NO_x$ FROM ENGINE EXHAUST

BACKGROUND AND SUMMARY OF THE INVENTION

This application claims the priority of Germany Application No. 196 51 492.4-43, filed in Germany on Dec. 11, 1996, the disclosure of which is expressly incorporated by reference herein.

This invention relates to an effective, reliable device with a simple and compact design for removing $NO_x$ from exhaust.

Emission of nitrogen oxides ($NO_x$) from internal combustion engines constitutes a significant environmental burden. While gasoline engines with three-way catalytic converters, operated with a fuel-air mixture of lambda=1, often conform to current regulations, Diesel and lean-mix engines, which consume less fuel because of the large quantity of used air during combustion pose a unique problem. Special $NO_x$ removal is necessary; so-called Denox catalytic converters are used for this purpose but they can only achieve a 50% maximum degree of conversion or removal.

It is therefore an object of the invention to provide an effective and reliable device with a simple and compact design for more efficiently removing $NO_x$ from exhaust. It is also an object of this invention to provide a method using the device.

This goal is achieved according to the invention by a device with a porous absorbent body saturated with a liquid alkaline electrolyte for absorbing $NO_x$ as nitrate and nitrite and electrodes for electrochemical decomposition of nitrate and nitrite to form nitrogen.

Absorption of $NO_x$ to form nitrate and nitrite takes place in the device according to the invention, followed by electrochemical decomposition of the nitrate and/or nitrite. $NO_x$ consists essentially of NO and $NO_2$. With $NO_2$ and nitrate, the following reactions take place in the device according to the invention:

1. Absorption:

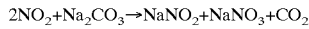

$$2NO_2+Na_2CO_3 \rightarrow NaNO_2+NaNO_3+CO_2 \quad (1)$$

2. Electrochemical Decomposition (Example: Nitrite)

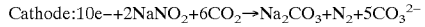

$$Cathode: 10e^- + 2NaNO_2 + 6CO_2 \rightarrow Na_2CO_3 + N_2 + 5CO_3^{2-} \quad (2)$$

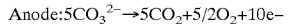

$$Anode: 5CO_3^{2-} \rightarrow 5CO_2 + 5/2 O_2 + 10e^-$$

The liquid alkaline electrolyte preferably consists of a salt melt, especially of a ternary mixture of the carbonates of lithium, sodium, and potassium. In the eutectic with approximately 43 mol. % lithium carbonate, 31 mol. % sodium carbonate, and 25 mol. % potassium carbonate, this mixture melts at approximately 400° C. and is stable at temperatures of more than 1000° C. without decomposing. Since the temperature of the exhaust from an internal combustion engine is far above 400° C. and definitely less than 1000° C. under normal operating conditions, the salt mixture is converted to the molten state by the temperature of the exhaust and is kept in the molten state. $NO_x$ also diffuses into the solid salt mixture so that even when the engine is cold, $NO_x$ is removed from the exhaust.

Lean-mix gasoline engines and diesel engines, because of the large quantity of excess air during combustion, produce an especially high $NO_x$ content in the exhaust. But, because of the large quantity of air used during combustion, exhaust from these engines has a relatively low temperature even when the engine is in the normal operating state. Accordingly, according to the invention, other eutectic mixtures can be used that melt at lower temperatures. One example is a eutectic mixture of alkaline or alkaline-earth metal carbonates with alkaline or alkaline-earth nitrates or nitrites.

Gas channels extend through the absorbing body, with the exhaust containing $NO_x$ to be scrubbed being introduced into the channels and being clean when it leaves the channels. The number and diameter of the gas channels is set so that $NO_x$ is absorbed as quantitatively as possible and the increase in flow resistance is kept within limits.

In order for the absorbent body to be saturated with the liquid alkaline electrolyte, it is made porous, preferably as a sintered body. The pore size of the absorbent body is set so that as large a quantity of electrolyte as possible is retained by capillary forces. Normally the average pore size of the absorbent body should not exceed 10 $\mu$m.

The pores of the absorbent body can be filled completely or partially with the molten electrolyte. If partially filled, the electrolyte preferably forms a film on the pore wall. This forms a large absorption surface for $NO_x$ from the exhaust. The absorbent body, in addition to the partially filled pores for gas transport, must also have a porosity that is suitable for transporting liquid electrolyte. The absorbent body preferably has a bimodal structure with relatively large pores for transporting gas and small pores for a confluent cohesive electrolyte phase. The small pores are located between the gas channels and the large gas transport pores and the electrodes. A bimodal pore structure of this kind can be produced by sintering particles having a microporous structure being produced by sintering particles of much smaller size, which are then comminuted. The average porosity of the particles used for sintering can be 0.05 $\mu$m to 1 $\mu$m for example, while the pores that result following sintering of these particles with microporosity can have a size of 5 $\mu$m to 20 $\mu$m.

Several embodiments of the porous absorbent body are possible. In a first embodiment, the absorbent body consists of a ceramic that is not an electrical conductor, with the electrodes extending into the porous absorbent body in the form of rods. In another embodiment, plates made of porous electrode material stacked on top of one another are used to form the electrode layers with the layers of electrode material or plates of material having gas channels traversed by the exhaust and having porous separating layers that are not electrical conductors between the electrode material layers and/or plates.

In the first embodiment, the absorbent body preferably consists of lithium aluminate. Aluminum oxide can also be used, which is converted partially into lithium aluminate by contact with an electrolyte salt containing lithium. Instead, it is also possible to use ceroxide or zirconium oxide, possibly in the lithiated form, to make the absorbent body or to use lithium zirconate or another material that is not an electrical conductor and is resistant to the molten electrolyte and also sinterable. The electrodes can consist of a compact material or be formed in turn from sintered bodies. Sintered bodies have the advantage in this connection that they have a larger surface and thus produce a greater reaction so that the size of the device according to the invention can be kept small.

The electrode material must be stable with respect to the electrolyte melt and must exhibit low polarization in addition to being sinterable. Preferably, lithiated nickel oxide is used as the electrode material. For a sintered electrode, a rod sintered from nickel powder can be oxidized to form nickel oxide and can then be lithiated, with lithiation possibly being performed even during the operation of the device. Instead of using nickel oxide doped with lithium, lithium metallites can also be used as the electrode material: lithium ferrite, lithium manganite, or lithium cobaltite. The use of noble metals such as gold or platinum for the electrode material is also possible but is generally too expensive.

The nitrates and nitrites formed in the alkaline electrolyte move towards the electrodes by diffusion and convection. Diffusion occurs because of the differences in concentration between the area of the absorbent body where the $NO_x$ is absorbed and the area of the electrodes due to the chemical decomposition of the nitrate and nitrite. Convection occurs because of the temperature differential between these two areas so that substrate moves toward the electrodes or to the area of electrochemical decomposition.

The electrodes are prepolarized to the decomposition potential of the nitrate and nitrite by applying a voltage from the on-board electrical system (battery, alternator) of the motor vehicle. The applied voltage should reach the decomposition potential of the nitrate and nitrite but must not exceed it significantly. In this way, the system can be designed to be self-regulating: all of the nitrates and nitrites that arrive at the electrodes are decomposed or no current flows.

Alternatively, the electrochemical potential can be generated by local elements rather than an external power source by using different electrode materials whose contact voltage results in the chemical decomposition of nitrate and nitrite.

BRIEF DESCRIPTION OF THE DRAWINGS

FIG. 1 is a cross section through a first embodiment of the device;

FIG. 2 is an enlarged view of a portion of the device according to FIG. 1;

FIG. 3 is a considerably enlarged view of a portion of the device according to FIGS. 1 and 2;

FIG. 4 shows a cross section through a second embodiment of the device; and

FIG. 5 is a schematic view of the subsequent treatment of the exhaust from an internal combustion engine.

DETAILED DESCRIPTION OF THE DRAWINGS

According to FIG. 1, the device comprises a cylindrical absorbent body 1 which can be located in the pipe of an exhaust system, not shown, of a motor vehicle. Absorbent body 1 has a shape resembling an oxidation catalytic converter for a motor vehicle. It is traversed by continuous rectangular gas channels 2 that extend from one end of the cylinder to the other, through which the exhaust to be scrubbed flows. Absorbent body 1 is porous. The porous intermediate walls 3 between channels 2 are saturated with an alkaline salt that forms a thin film 4 on the inside walls of channels 2. The alkaline salt, which can be a mixture of the carbonates of lithium, sodium, and potassium absorbs the $NO_x$ contained in the exhaust as nitrate and nitrite.

The nitrate and nitrite are then decomposed electrochemically according to reaction equation (2). Electrodes are distributed pairwise in a portion of channels 2 of absorbent body 1. Electrodes 5, 6 are designed as rods that extend essentially through the entire absorbent body 1. Anode 5 and cathode 6 of each pair of electrodes are located in adjacent channels 2. Electrode rods 5, 6 are connected at one end with a power supply (not shown) that can be connected to the battery or the on-board electrical system of the motor vehicle. Absorbent body 1, which can be produced for example by extrusion followed by sintering, is made of a nonconducting ceramic material, lithium aluminate for example.

The sintered structure of porous absorbent body 1 produced from ceramic particles 7 is particularly evident in FIG. 2. Particles 7 can have a porous structure or exhibit microporosity. This produces a bimodal pore structure that consists of pores 8 between particles 7 and also of the micropores of particles 7 themselves. In a bimodal pore structure of this kind, the micropores of particles 7 are filled essentially completely while the large pores 8 between particles 7 are only partially filled with the alkaline salt that constitutes the absorption medium according to the above reaction equation (1) and also constitutes the electrolyte for electrochemical decomposition according to reaction equation (2).

As a result of only partially filling pores 8, a film 9 of alkaline salt is formed on the walls of pores 8 and thus a large absorption and reaction surface is formed, as shown in FIG. 3. Electrodes 5 and 6, as shown in FIG. 2, can be produced in turn by sintering particles 10, and can consist of lithiated nickel oxide.

According to FIG. 4, absorbent body 1' consists of a stack of layers or plates 11 made of a porous electrode material, a sintered body made of lithiated nickel oxide for example. Plates 11 are traversed by gas channels 2' which extend from the end of absorbent body 1' at which the exhaust to be scrubbed and containing $NO_x$ enters, to the other end of absorbent body 1', where the exhaust, scrubbed clean of $NO_x$, escapes. For potential separation, each pair of electrode material layers 11 has a porous separating layer 12, made by sintering located between them. The separating layer 12 consists of a material that is not an electrical conductor such as lithium aluminate. Electrode material layers 11 and separating layers 12 are saturated with an alkaline salt to absorb $NO_x$ from the exhaust. The salt forms the electrolyte and can be a ternary mixture of the carbonates of lithium, sodium, and potassium.

A potential is applied to the two outer layers 11 of absorbent body 1' by means of leads 13 and 14. The voltage applied from the outside is distributed regularly over inner plates 11 when the current flows. This means that if the voltage applied to the two outer plates 11 is 7 V for example, the potential difference between the two sides of each layer 11 will be 1 V as shown in FIG. 4. In this embodiment the electrodes distributed pairwise in absorbent body 1' are formed by electrode material layers 11. The embodiment according to FIG. 4 has the advantage that plates 11 and 12 are easy to manufacture; only the outer plates 11 need to have contacts attached.

According to FIG. 5, in an exhaust aftertreatment system, internal combustion engine 15 is followed first by a two-way oxidation catalytic converter 16 and then by device 17 according to the invention for $NO_x$ scrubbing. As a result, the $NO_x$ is essentially oxidized to $NO_2$ in oxidation catalytic converter 16. $NO_2$ is absorbed more rapidly, when the alkaline salt melt of absorber 1, 1' of device 17 according to the invention is saturated. Under certain conditions, however, device 17 can be located upstream of oxidation catalytic converter 16. Reference number 18 refers to the battery that supplies electrodes 5 and 6 with current, and does the same for layers 11 through leads 13 and 14.

What is claimed is:

1. An apparatus for treating $NO_x$ from exhaust, comprising:
   a porous absorbent body saturated with a liquid alkaline electrolyte for absorbing $NO_x$ as nitrate and nitrite; and
   electrodes distributed pairwise in said absorbent body for electrochemical decomposition of the nitrate and nitrite to form nitrogen.

2. An apparatus according to claim 1, wherein the liquid alkaline electrolyte is formed by a salt melt.

3. An apparatus according to claim 2, wherein the salt melt contains an alkaline carbonate.

4. An apparatus according to claim 3, wherein the alkaline carbonate is a mixture of carbonates of lithium, sodium, and potassium.

5. An apparatus according to claim 3, wherein the salt melt is a mixture of at least one of alkaline and alkaline-earth carbonate and at least one of an alkaline and alkaline-earth nitrate or nitrite.

6. An apparatus according to claim 1, wherein the absorbent body has gas channels.

7. An apparatus according to claim 1, wherein the porous absorbent body is produced by sintering, the sintering producing sintered particles.

8. An apparatus according to claim 7, wherein the absorbent body has a bimodal pore structure and wherein the sintered particles exhibit microporosity.

9. An apparatus according to claim 1, wherein the average pore size of the absorbent body is less than 10 μm.

10. An apparatus according to claim 1, wherein the absorbent body consists of lithium aluminate, lithiated zeroxide, zirconium oxide, or lithium zirconate.

11. An apparatus according to claim 1, wherein the electrodes are made in the form of rods.

12. An apparatus according to claim 11, wherein the electrodes are formed by sintered bodies.

13. An apparatus according to claim 1, wherein the absorbent body has a plurality of porous layers made of electrode material to form the electrodes distributed pairwise and has gas channels and two outer electrical material layers, with porous separating layers being located between said porous layers.

14. An apparatus according to claim 13, wherein electrical leads are connected to the two outer electrode material layers.

15. An apparatus according to claim 1, wherein the electrode material is lithium-doped nickel oxide or a lithium metallite.

16. An apparatus according to claim 1, wherein the electrodes are connected to an on-board electrical system of a motor vehicle.

17. An apparatus according to claim 1, wherein different electrode materials are provided to form local elements to generate the potential required to decompose the nitrate and nitrite.

18. An apparatus according to claim 1, further comprising an oxidation catalytic converter located downstream of the porous absorbent body.

19. An apparatus according to claim 1, further comprising an oxidation catalytic converter located upstream of the porous abosorbent body.

20. A method for removing $No_x$ from exhaust, comprising:
    absorbing the $NO_x$ as a nitrate or a nitrite with a porous absorbent body saturated with a liquid alkaline electrolyte; and
    decomposing the nitrate or nitrite with electrodes distributed pairwise in said absorbent body for electrochemical decomposition of the nitrate and nitrite to form nitrogen.

21. The method according to claim 20, further comprising treating the exhaust with an oxidation catalytic converter.

22. The method according to claim 21, wherein the treating the exhaust with an oxidation catalytic converter step happens before the method removing the $NO_x$.

23. The method according to claim 21, wherein the treating the exhaust with an oxidation catalytic converter step happens after the method removing the $NO_x$.

24. The method according to claim 20, wherein said exhaust comes from Diesel engines or lean-mix gasoline engines.

* * * * *